US008630856B2

(12) United States Patent
Balchandran et al.

(10) Patent No.: US 8,630,856 B2
(45) Date of Patent: *Jan. 14, 2014

(54) RELATIVE DELTA COMPUTATIONS FOR DETERMINING THE MEANING OF LANGUAGE INPUTS

(75) Inventors: Rajesh Balchandran, Elmsford, NY (US); Linda M. Boyer, Ossining, NY (US)

(73) Assignee: Nuance Communications, Inc., Burlington, MA (US)

(*) Notice: Subject to any disclaimer, the term of this patent is extended or adjusted under 35 U.S.C. 154(b) by 429 days.

This patent is subject to a terminal disclaimer.

(21) Appl. No.: 12/499,544

(22) Filed: Jul. 8, 2009

(65) Prior Publication Data

US 2010/0010805 A1    Jan. 14, 2010

Related U.S. Application Data

(63) Continuation of application No. 12/035,944, filed on Feb. 22, 2008, now Pat. No. 7,562,016, which is a continuation of application No. 10/677,044, filed on Oct. 1, 2003, now Pat. No. 7,366,666.

(51) Int. Cl.
*G10L 15/14* (2006.01)
*G10L 15/18* (2013.01)

(52) U.S. Cl.
USPC ............ 704/251; 704/257; 704/231; 704/246

(58) Field of Classification Search
USPC ....... 704/251, 257, 254, 9, E15.001, E15.004
See application file for complete search history.

(56) References Cited

U.S. PATENT DOCUMENTS

| 5,181,163 | A | | 1/1993 | Nakajima et al. |
| 5,261,009 | A | | 11/1993 | Bokser |
| 5,317,507 | A | | 5/1994 | Gallant |
| 5,477,450 | A | | 12/1995 | Takeda et al. |
| 5,617,509 | A | * | 4/1997 | Kushner et al. ............... 704/256 |
| 5,754,972 | A | | 5/1998 | Baker et al. |
| 5,844,798 | A | | 12/1998 | Uramoto |
| 5,983,169 | A | | 11/1999 | Kozma |
| 6,092,039 | A | * | 7/2000 | Zingher ........................ 704/221 |
| 6,094,635 | A | | 7/2000 | Scholz et al. |
| 6,216,123 | B1 | * | 4/2001 | Robertson et al. .................... 1/1 |

(Continued)

OTHER PUBLICATIONS

David Yarowsky "Unsupervised word sense disambiguation rivaling supervised methods",ACL '95 Proceedings of the 33rd annual meeting on Association for Computational Linguistics ,1995, pp. 189-196.*

(Continued)

*Primary Examiner* — Pierre-Louis Desir
*Assistant Examiner* — Abdelali Serrou
(74) *Attorney, Agent, or Firm* — Wolf, Greenfield & Sacks, P.C.

(57) ABSTRACT

A method for processing language input can include the step of determining at least two possible meanings for a language input. For each possible meaning, a probability that the possible meaning is a correct interpretation of the language input can be determined. At least one relative data computation can be computed based at least in part upon the probabilities. At least one irregularity within the language input can be detected based upon the relative delta computation. The irregularity can include mumble, ambiguous input, and/or compound input. At least one programmatic action can be performed responsive to the detection of the irregularity.

30 Claims, 3 Drawing Sheets

(56) References Cited

U.S. PATENT DOCUMENTS

| | | | |
|---|---|---|---|
| 6,327,566 | B1 | 12/2001 | Vanbuskirk et al. |
| 6,374,257 | B1 | 4/2002 | Guay et al. |
| 6,453,315 | B1* | 9/2002 | Weissman et al. .................... 1/1 |
| 6,529,865 | B1 | 3/2003 | Duan et al. |
| 6,556,970 | B1* | 4/2003 | Sasaki et al. ................. 704/257 |
| 6,615,172 | B1* | 9/2003 | Bennett et al. ............... 704/257 |
| 7,006,970 | B2* | 2/2006 | Jinnai et al. .................. 704/239 |
| 7,024,407 | B2 | 4/2006 | Bradford |
| 7,089,178 | B2* | 8/2006 | Garudadri et al. ............ 704/205 |
| 7,194,133 | B2* | 3/2007 | Jinnai .......................... 382/209 |
| 7,725,307 | B2* | 5/2010 | Bennett ............................. 704/9 |
| 2002/0078091 | A1* | 6/2002 | Vu et al. ....................... 707/513 |
| 2003/0004717 | A1 | 1/2003 | Strom et al. |
| 2003/0233230 | A1* | 12/2003 | Ammicht et al. ............. 704/235 |
| 2003/0233232 | A1* | 12/2003 | Fosler-Lussier et al. ..... 704/251 |
| 2004/0260543 | A1 | 12/2004 | Horowitz et al. |

OTHER PUBLICATIONS

David Yarowsky "Word-sense disambiguation using statistical models of Roget's categories trained on large corpora", COILING '92 Proceedings of the 14th conference on Computational linguistics. 1992, vol. 2, pp. 454-460.*

* cited by examiner

RELATIVE DELTA COMPUTATIONS FOR DETERMINING THE MEANING OF LANGUAGE INPUTS

CROSS REFERENCE TO RELATED APPLICATIONS

This application is a continuation (CON) of U.S. application Ser. No. 12/035,944 entitled "RELATIVE DELTA COMPUTATIONS FOR DETERMINING THE MEANING OF LANGUAGE INPUTS," filed Feb. 22, 2008, which is a continuation (CON) of U.S. application Ser. No. 10/677,044 entitled "RELATIVE DELTA COMPUTATIONS FOR DETERMINING THE MEANING OF LANGUAGE INPUTS," filed Oct. 1, 2003, all of which applications are herein incorporated by reference in their entirety.

BACKGROUND

1. Field of the Invention

The present invention relates to the field of computer science and, more particularly, to natural language understanding and interpretation.

2. Description of the Related Art

The goal of a natural language processing application is to convert a language input used by humans intoters in the same manner in which humans communicate with each other. Conventional nat a language that a computer is capable of understanding so that humans can communicate with compu ural language processing applications generate a number of possible meanings or a "top-n" list of possible meanings for a language input along with a probability for each. Sometimes a language input provider, often a computer user, will be asked to confirm that a computer correctly interpreted a language input. The natural language processing application can also provide a selection mechanism by which the input provider can replace a predicted meaning, typically the possible meaning with the greatest probability, with a selected one of the possible meanings from the top-n list. Three common problems that cause natural language processing applications to provide incorrect predicted meanings include mumble, ambiguous input, and compound input.

Input can be considered mumble (junk input, out of domain input or rejected input) if the input is not capable of being interpreted correctly. That is, the input may be not well formed owing to grammatical, typographical, spelling, speech recognition, handwriting recognition, or other similar input recognition errors. Conventional natural language processing applications typically handle input misrecognition errors by validating words and phrases in the input using spelling and grammar checking tools. Mumble can also include input specified in unusual terminology or out of the domain of the natural language interpreter. That is, the language input can include numerous ramblings and digressions that can make an input difficult for a natural language processing application to properly interpret the meaning of the input. Conventional natural language processing applications generally handle rambling by limiting language input to a closed-set of possible interpretations, thereby limiting the capabilities of the natural language processing application. Left undetected, mumble can be a significant cause of incorrect natural language processing interpretations.

Ambiguous input is input that is capable of being interpreted in two or more possible ways. That is, ambiguous input can easily be mapped to two or more supported actions or possible interpretation categories. For example, an input to a banking system of "I need some money" can be an ambiguous input representing either a request for a loan or a request for a withdrawal from an existing account. The ambiguity inherent in the human language combined with the precision preferred for computers can make detection and correction of ambiguous input an extremely difficult proposition. Conventional natural language processing applications generally fail to detect ambiguous situations, which is one reason why conventional applications provide a top-n list of meanings and/or continuously prompt users to confirm interpretations.

Compound input can be input that is composed of a combination of two or more actions or interpretation categories within a single sentence or phrase. Correctly interpreting a compound input requires the natural language processing application to identify two or more different meanings from a single language input and join them into a single combined interpretation. For example, an input to a banking system of "I need help on withdrawing money from my account" can be a compound input. One valid meaning for the exemplary input can include a request for help. A second valid meaning for the exemplary input can include a request to withdraw money. Consequently, a combined compound interpretation of obtaining help on withdrawing money can be desired based upon the single language input. Conventional natural language processing applications generally interpret compound input as an input having just one meaning instead of a combination of two meanings.

SUMMARY OF THE INVENTION

The present invention provides a method, a system, and an apparatus for handling mumble, ambiguous input, and compound input when performing natural language processing tasks. The invention can be utilized once a natural language processing application has generated at least two possible meanings or a "top-n" list of meanings for a language input along with corresponding meaning probabilities. The meanings can be ordered by probability value into an ordered listing. A new value, referred to as a relative delta computation, can be determined for each pair of neighboring meanings within the ordered listing.

The relative delta computation can be a percentage used to evaluate how close two meanings predicted by the natural language processing application are, relative to each other. Accordingly, the relative delta computations can transform a list of raw probabilities of the top-n meanings into a sequence of percentages, each percentage depicting the relative likelihood that one meaning is correct compared to the next. Unlike raw probabilities, relative delta computations always fall within a predictable percentile range regardless of the conventions used to compute the raw probabilities. Consequently, relative delta computations can be handled in a uniform manner regardless of the specific manner in which the raw probabilities are computed, thereby allowing routines based upon relative delta computations to be easily integrated into any variety of language processing systems without the need for system-specific modifications.

A number of irregularities or anomalies, such as mumble, ambiguous input, and compound input, can be detected by analyzing a series of relative delta computation values. Analysis of each type of irregularity reveals that problematic input is associated with characteristic relative delta values that are distinguishable from input not containing irregularities. For example, the relative delta computation values for input containing mumble are much lower than relative delta computations for input not containing mumble. Similarly, ambiguous input and/or compound input situations each result in relative delta computations much lower than the relative delta computations for input not containing ambiguous input and/or compound input.

A series of thresholds each designed to detect a particular type of irregular input can be determined. The relative delta computations can be compared against the thresholds in order to detect the existence of irregularities within language inputs. In one embodiment, confidence values can be used in conjunction with the relative delta computations to detect irregularities within language input.

One aspect of the present invention can include a method for processing language input. A method can include the step of determining at least two possible meanings for a language input. For each possible meaning, a probability that the possible meaning is a correct interpretation of the language input can be determined. At least one relative data computation can be computed based at least in part upon the probabilities. For example, a numerator can be computed by subtracting a probability of a second meaning being correct from the probability of a first meaning being correct. A denominator can be set to the probability for the first meaning. The relative delta computation can be calculated by dividing the numerator by the denominator.

Any irregularity within the language input can be detected based upon the relative delta computation. The irregularity can include mumble, ambiguous input, and/or compound input. At least one programmatic action can be performed responsive to the detection of the irregularity. For example, the programmatic action can be an action that prompts a user for further input so that the irregularity can be resolved. Particular embodiments can detect more than one irregularity and can differentiate between the different types of irregularities. Different programming actions can result from the detection of different types of irregularities.

In one embodiment, the method can receive a top-n list of possible meanings for the language input, where the determined possible meanings are contained within the top-n list. In a further embodiment, the two meanings with the highest confidence values can be selected. In another embodiment of the invention, three or more possible meanings can be detected. The meanings can be ordered according to confidence values. Each pair of sequentially ordered meanings can be used to calculate a relative delta computation. Multiple relative delta computation can be used to increase the accuracy of the irregularity detection process.

Another aspect of the present invention can include a system for processing language input. The system can include an anomaly detector, a natural language processor, a threshold data store, and/or a training engine. The anomaly detector can detect the occurrence of at least one irregularity using at least one relative delta computation. Detectable irregularities can include mumble, ambiguous input, and/or compound input. The natural language processor can convert a language input into a multitude of possible meanings. The natural language processor can also assign a confidence value to each of the possible meanings. The confidence value can be a raw probability indicating the likelihood that a meaning represents a correct interpretation of an associated language input. The possible meanings and confidence values can be used by the anomaly detector to compute the relative delta computations. The threshold data store can store a multitude of thresholds used by the anomaly detector to detect irregularities. Each of the stored thresholds can be associated with a pair or a set of meanings generated by the natural language processor. The training engine can automatically generate the thresholds stored within the threshold data store.

Additionally, the anomaly detector can include a sorter, a relative delta score calculator, a relative delta score interpreter, and/or a learning module. The sorter can order possible meanings according to associated confidence values. The relative delta score calculator can calculate relative delta computations. The relative delta score interpreter can compare relative delta computations to threshold values in order to detect one or more irregularities within language input. The learning module can adjust stored threshold values.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
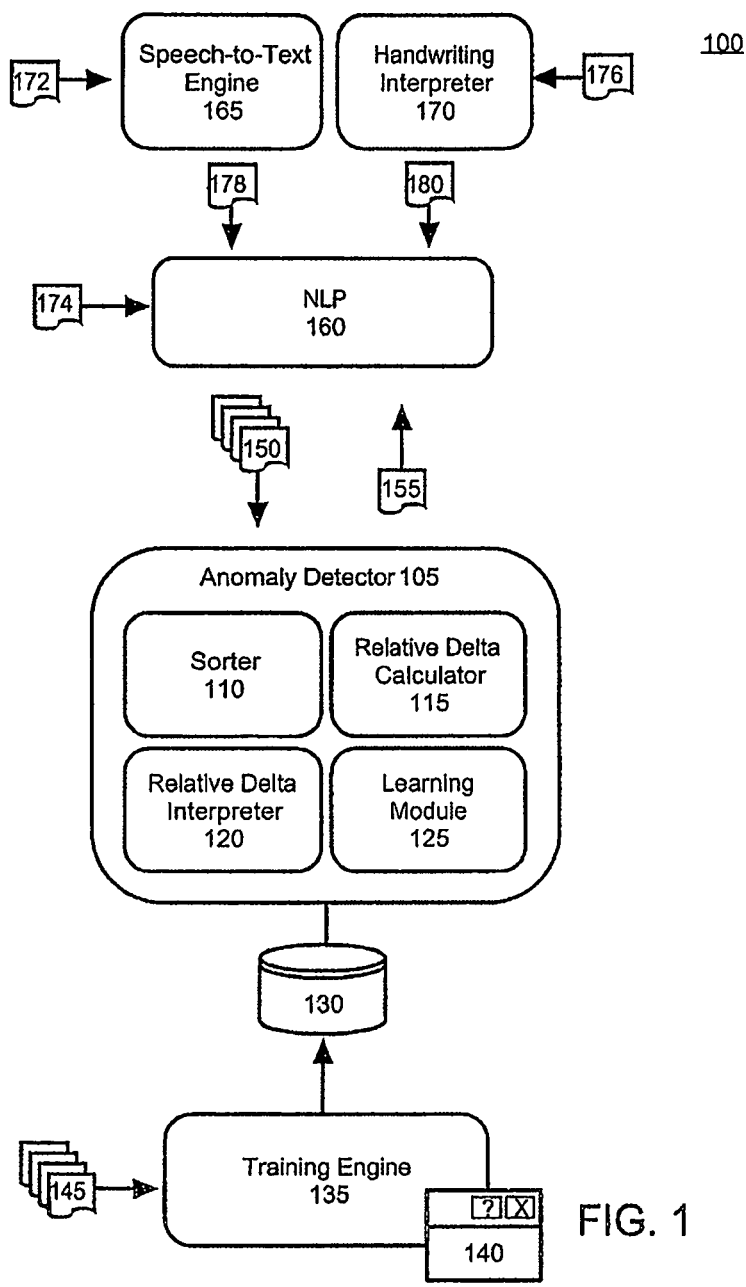
FIG. 1 is a schematic diagram illustrating an exemplary system for processing language input in accordance with one embodiment of the inventive arrangements disclosed herein.

FIG. 1 is a schematic diagram illustrating an exemplary system 100 for processing language input in accordance with the inventive arrangements disclosed herein. The system 100 can include a natural language processor (NLP) 160, an anomaly detector 105, a threshold data store 130, and a training engine 135. The NLP 160 can interpret textual input written that includes natural language segments into an input that a computer is capable of understanding so that humans can communicate with computers in approximately the same fashion in which humans communicate with each other. More specifically, the NLP 160 can accept a language input and generate a number of possible meanings for a language input along with a confidence value for each. A confidence value can indicate the probability that the associated possible meaning is a correct interpretation of the language input. The possible meanings and confidence values can collectively be referred to as a "top-n" list 150 of possible meanings.

The language input interpreted by the NLP 160 can include, but is not limited to, text input 174, speech-converted input 178, and handwriting-converted input 180. Text input 174 includes any input, such as keyboard entries, that include a language segment. The language segment can include a sentence, a phrase, a multitude of words, and the like. The speech-converted input 178 can be the textual input resulting from a speech input 172 being processed by a speech-to-text engine 165. The handwriting-converted input 180 can be the textual input resulting from a handwriting input 176 being processed by a handwriting interpreter 170.

Regardless of whether the language input used by the NLP 160 is a text input 174, a speech-converted input 178, a handwriting-converted input 180, or some other language input, the language input can include one or more anomalies or irregularities. As used herein, irregularities can include, but are not limited to, mumble, ambiguous input, and compound input. Mumble can be extraneous or nonsensical input segments within the language input. Mumble can result from input inaccuracies such as typographical errors, speech recognition errors, handwriting recognition errors, grammatical errors, and the like. Additionally, mumble can include words and phrases contained within an input, which are not necessary for discerning the meaning of the language input. Mumble can include unnecessary ramblings and wordiness, which can lower the accuracy of the NLP 160. Ambiguous input can be input that can easily be mapped to two or more interpretation categories. Compound input can be input that is composed of a combination of two or more meanings within a single language input.

When the language input includes one or more irregularities, the accuracy of the NLP 160 can decrease substantially. It can therefore be beneficial to detect irregularities so that appropriate programmatic actions can be taken. One such programmatic action can include prompting a user to provide additional input to resolve the irregularity. For example, the user can be prompted as to whether that user's input related to a first action, a second action, neither action, or both the first and the second action.

The anomaly detector 105 can receive the top-n list 150, detect irregularities using the top-n list 150, and convey detection data 155 to the NLP 160 or other application capable of taking appropriate programmatic actions based upon the detection data 155. The anomaly detector 105 can include a sorter 110, a relative delta score calculator 115, a relative delta score interpreter 120, and a learning module 125. The sorter 110 can order the meanings of the top-n list 150 according to associated confidence values. The relative delta calculator 115 can then determine relative delta computations for sequentially ordered pairs of the meanings. A relative delta computation can be a value indicating how close the two meanings of a sequentially ordered pair are relative to each other.

For example, meanings ($M_{1,n}$) included in the top-n list 150 can be ordered by the sorter 110 from highest confidence value ($C_1$) to lowest confidence value ($C_n$). Once ordered, the relative delta calculator 115 can generate one or more relative delta computations ($\Delta$). The calculation of each relative delta computation requires two sequentially ordered meanings, so that n−1 relative delta computations can be generated from the top-n list 150. The relative delta computations can be any suitable probability calculated in any of a variety of fashions.

In one embodiment, the relative delta computation can represent a percentage calculated by subtracting the lower confidence value in a meaning pair from the higher confidence value and dividing by the higher confidence value. Accordingly, equation (1) can be used by the relative delta calculator 115 to determine relative delta computations.

$$\Delta_j = \frac{(C_j - C_{j+1})}{C_j} \times 100 \quad \text{Equation (1)}$$

To determine relative delta computations ($\Delta_{1,n-1}$) for each meaning pair in the top-n list 150 using equation (1), the variable j can be set to the integers 1 to n−1 inclusive.

Once one or more relative delta computations have been calculated, the relative delta interpreter 120 can compare one or more of the relative delta computations against one or more threshold values. These comparisons can be used to determine whether the language input that generated the tops list 150 contains irregularities. Different threshold values can indicate the presence or absence of particular types of irregularities within the language input. Further, different threshold values can be used for each set of meaning pairs to indicate the presence or absence of a particular irregularity. Further, the relative delta interpreter 120 can utilize the confidence values for the meanings in conjunction with the relative delta values and thresholds in order to detect irregularities within language input.

For example, the relative delta computations for input containing mumble can be much lower than the corresponding relative delta computations for input not containing mumble. Moreover, the confidence values for input including mumble can be lower than the confidence values for inputs not including mumble. Additionally, the relative delta computations for input containing ambiguous input can be much lower than the relative delta computations for input not containing ambiguous input. Further, the relative delta computations for input containing compound input can be much lower than the relative delta computations for input not containing compound input.

The learning module 125 can adjust the threshold values stored within the threshold data store 130. For example, the learning module 125 can provide an interface permitting an authorized user to access and modify threshold values directly. Further, the learning module 125 can automatically adjust the threshold values in accordance with interactions involving the anomaly detector 105.

For example, a user of an application can indicate that the NLP 160 incorrectly interpreted language input because the anomaly detector 105 failed to detect an irregularity within the language input. Feedback of the situation can be conveyed to the learning module 125. The learning module 125 can responsively adjust the appropriate threshold associated with the irregularity so that the irregularity will be properly detected in the future. In another example, the learning module 125 can adjust one or more thresholds to prevent irregularity reporting in situations where no irregularities exist within the language input.

In one embodiment, the threshold values stored within the threshold data store 130 and used by the anomaly detector 105 can be generated by the training engine 135 based upon training input 145. The training input 145 can include training language inputs and corresponding desirable irregularity detection results. The training input 145 can be repetitively fed into the training engine 135, and the thresholds for detecting irregularities adjusted until the desirable irregularity detection results are achieved. Additional, unprocessed training data 145 can then be used to verify the appropriate thresholds have been established. The training process can be iteratively repeated until the verification process confirms that appropriate thresholds have been established.

The training engine 135 can include a training interface 140 that permits an authorized user to manipulate the training engine 135. The training engine 135 can generate thresholds based upon a fully automated process, a partially automated process involving some user interaction via the training interface 140, and/or a manual process using tools provided via the training interface 140. In one embodiment, training engine 135 tools can plot input instances and/or meaning pairs in charts to graphically illustrate distributions or clusters of anomaly detection events. A user can utilize the charts in a situational and/or subjective manner to establish and/or adjust the threshold values utilized by the anomaly detector 105.

An operational example illustrating a use of the anomaly detector 105 within system 100 follows. In the example, a language input of "I want some to receive money from my account" can be submitted to the NLP 160. The NLP 160 can interpret the language input into three possible meanings including "initialize withdrawal," "initialize loan," and "query account." These three meanings can be represented as $M_1$, $M_2$, and $M_3$. The NLP 160 can generate confidence values for meanings $M_1$, $M_2$, and $M_3$ of 0.412, 0.302, and 0.102, respectively. These confidence values can be represented as $C_1$, $C_2$, and $C_3$. Together the meanings and the confidence values form the town list 150, which can be conveyed to the anomaly detector 105.

The anomaly detector 105 can route the top-n list 150 to the sorter 110. The sorter 110 can then check the ordering of the meanings. Since the meanings $M_1$, $M_2$, and $M_3$ are already sorted in descending order according to their respective confidence values $C_1$, $C_2$, and $C_3$, the sorter 110 need not take any action. At this point, the top-n list 150 and/or data contained therein can be conveyed to the relative delta score calculator 115.

The relative delta calculator 115 can calculate a relative delta computation ($\Delta_1$) for the first meaning pair and can calculate a relative delta computation ($\Delta_2$) for the second meaning pair. The first and second meaning pairs can be represented as pair $pair_{(M1, M2)}$ and $pair_{(M2, M3)}$, respectively. Equations (2) and (3) show these relative delta calculations resulting in $\Delta_1$ of approximately 26.7% and $\Delta_2$ of approximately 66.2%.

$$\Delta_1 = \frac{(0.412 - 0.302)}{0.412} \times 100 = 26.7\% \quad \text{Equation (2)}$$

$$\Delta_2 = \frac{(0.302 - 0.102)}{0.302} \times 100 = 66.2\% \quad \text{Equation (3)}$$

Once the relative delta computations are performed, relative delta score interpreter 120 can search the threshold data store 130 for thresholds for $pair_{(M1, M2)}$ and $pair_{(M2,M3)}$. For example, the relative delta interpreter 120 can retrieve the thresholds of $T^{MUMBLE}=5\%$, $T^{AMBIGUOUS}=30\%$, and $T^{COMPOUND}=70\%$. Once the threshold values have been determined, the relative delta interpreter 120 can determine whether irregularities exist.

While irregularity detection can sometimes involve both $\Delta_1$ and $\Delta_2$, detection will often only involve $\Delta_1$, which can be computed based from the possible meanings with the highest confidence values. Since the value of $\Delta_1$ (26.7%) is not below $T^{MUMBLE}$ or 5%, mumble is not detected. Since $\Delta_1$ (26.7%) is below $T^{AMBIGUOUS}$, ambiguous input is detected.

Figure 2:
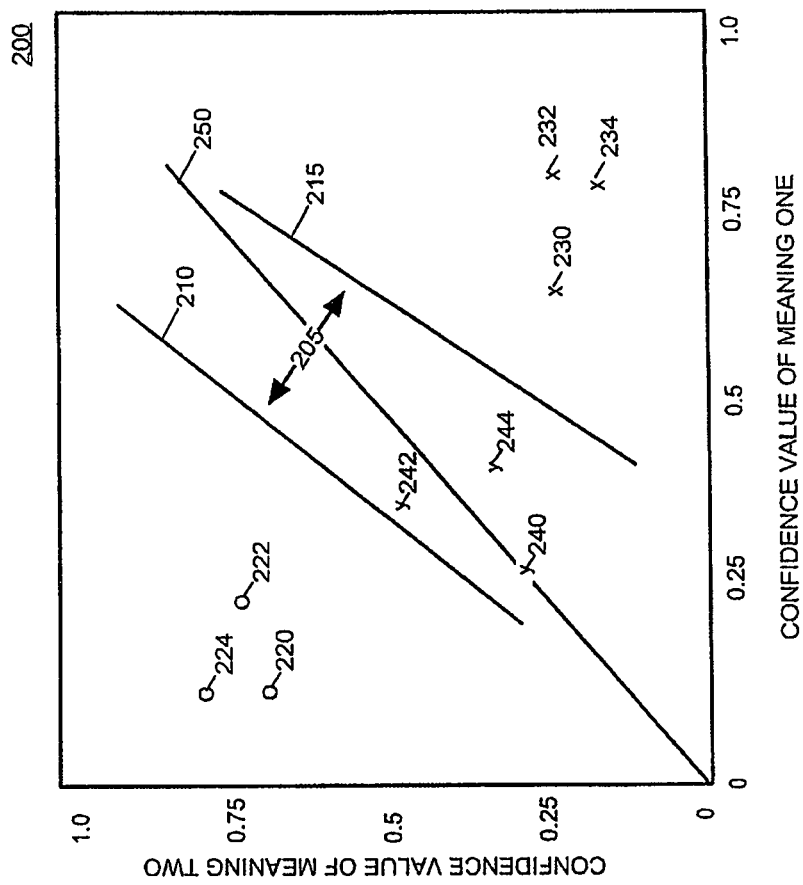
FIG. 2 is an exemplary chart plotting a multitude of confidence values to establish threshold values in accordance with one embodiment of the inventive arrangements disclosed herein.

FIG. 2 is an exemplary chart 200 plotting a multitude of confidence values for a meaning pair that can be used to establish threshold values for the meaning pair in accordance with one embodiment of the inventive arrangements disclosed herein. In another embodiment of the present invention, the chart 200 can be the basis for a view provided in a graphical user interface tool that can be used to interactively determine threshold values for the meaning pair. The chart 200 depicts the plotting of confidence values for multiple language input sentences involving a single meaning pair as the top two choices. The chart 200 can be utilized to help establish a threshold for a particular meaning pair. The chart 200 can also be utilized to optimize an existing threshold associated with the meaning pair.

Even though the chart 200 depicts the plotting of confidence values involving a single meaning pair, it should be noted that the same concept can be easily extended so that the second item of the meaning pair collectively represents all the other meanings (other than the first one) in the application. Thus, the chart 200 could show the relation between the first meaning and any other meaning that happens to be the second choice of the top-n confidence scores. Appreciably, in one embodiment, the chart 200 can be generated using the training engine 135 of FIG. 1.

In chart 200, confidence values for the first meaning of the meaning pair are shown along the abscissa and confidence values for the second meaning pair are shown along the ordinate axis. For each point in the chart, relative delta computational values can be computed using Equation 1. In this manner, multiple language input sentences can be graphically represented, showing the relationship between two or more meanings.

Plot points 230, 232 and 234, each marked by a circle, have high confidence values for meaning one relative to meaning two. Accordingly, plot points 230, 232, and 234 indicate the language input to be of meaning one and that no irregularity existed within the language inputs from which the points were plotted.

Similarly, plot points 220, 222 and 224, each marked by an "x", have high confidence values for meaning two relative to meaning one. Consequently, plot points 220, 222, and 224 indicate the language input to be of meaning two and that no irregularity existed within the language inputs from which the points were plotted.

On the other hand, plot points 240, 242 and 244, each marked by a by "y", have confidence values for meaning one and meaning two that are very close to each other, thereby indicating the possibility of irregularity within the language inputs from which the points were plotted. Graphically, such points can be identified as points that are close to the forty-five degree line 250 shown in the chart 200.

Lines 210 and 215 each represent a particular threshold value against which relative delta computations can be compared. As illustrated, points located above line 210 are derived from language inputs not containing irregularities and unambiguously represent meaning two. Similarly, points located below line 215 are derived from language inputs not containing irregularities and unambiguously represent meaning one. The area between line 210 and line 215 can be considered to be the region of irregularity 205. The region of irregularity 205 can represent the region where language input is likely to be mumble, ambiguous or compound. Lines 210 and 215 can be considered boundary lines separating the three types of language input—irregular input, input representing meaning one and input representing meaning two.

The graphical representation depicted in chart 200 can be used to estimate preferred threshold values, given a set of language input. This can be achieved by plotting data points from the language input confidence scores and by using the knowledge of the true meaning of the language input—whether an input sentence is irregular or not and whether it represents meaning one or two—and marking the data points appropriately as described above. Then the boundary lines 210 and 215 can be adjusted appropriately, graphically or otherwise to achieve maximum separation between the different types of input, and the relative delta computations represented by the two boundary lines indicate the thresholds that should be used.

Conversely, the chart 200 can also be used to analyze the effect of specific threshold values on the identification of irregularities in language input. This can be achieved by plotting the boundary lines for specific threshold values and observing the location of data points relative to the boundary lines.

The threshold values can be adjusted to achieve the desired balance between the number of false positives and false negatives in detecting irregularities in language input.

It should be noted that different charts like chart 200 can be generated for different meaning pairs. Further, multiple charts like chart 200 can be generated for a single meaning pair, where each chart illustrates a specific type of irregularity.

For example, different charts can be generated for a single meaning pair to illustrate thresholds for mumble, ambiguous input, and compound input.

Figure 3:
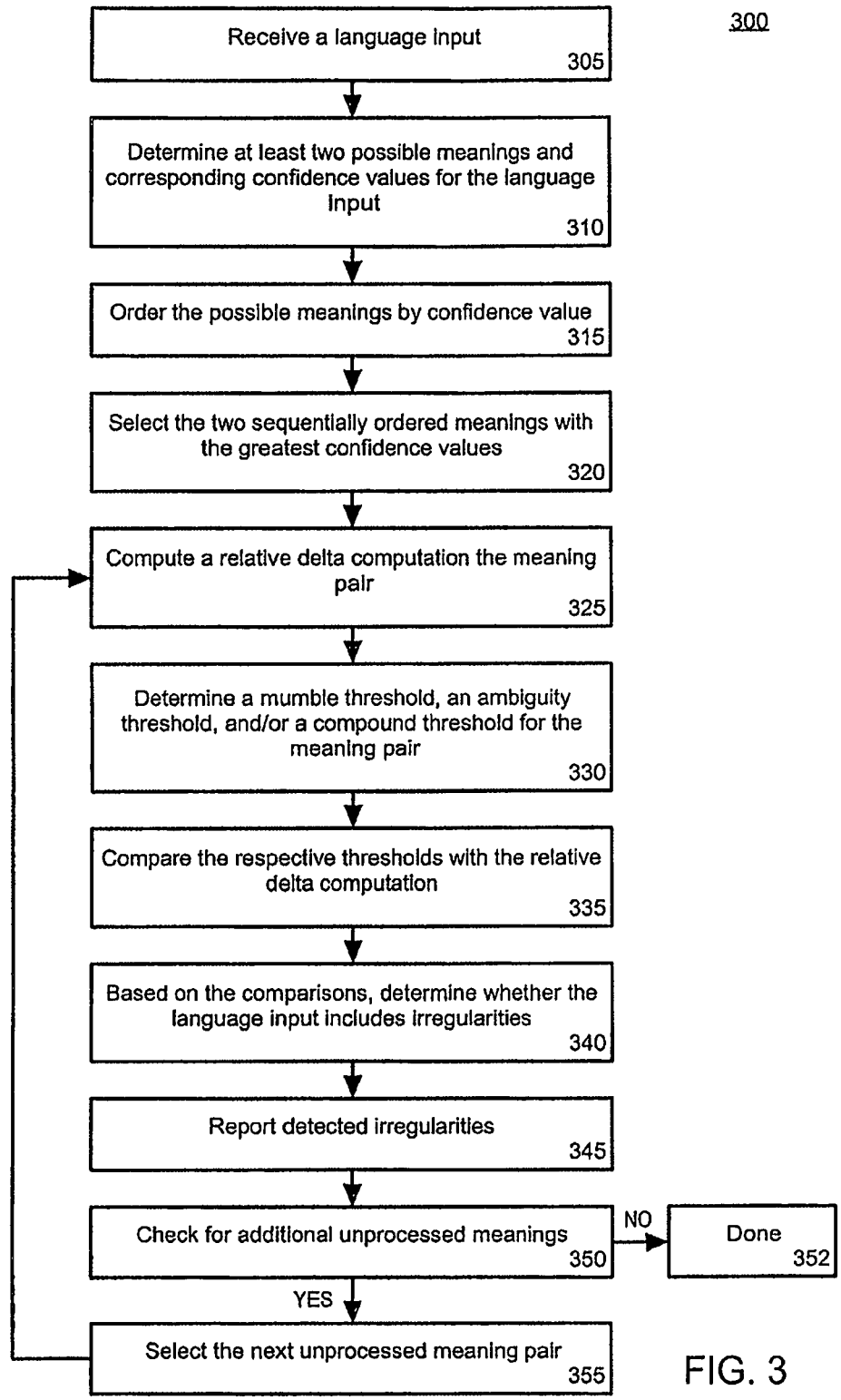
FIG. 3 is a flow chart illustrating an exemplary method for processing language input in accordance with one embodiment of the inventive arrangements disclosed herein.

FIG. 3 is a flow chart illustrating an exemplary method 300 for processing language input in accordance with the inventive arrangements disclosed herein. The method 300 can be performed in the context of a language processing system. The method can begin in step 305 with the receipt of a language input. In step 310, at least two possible meanings and corresponding confidence values can be determined for the language input. The confidence value can represent the probability that the corresponding meaning is a correct interpretation of the language input. In step 315, the possible meanings can be ordered according to the values of the corresponding confidence values. In step 320, two sequentially ordered meanings with the greatest confidence values can be selected. In step 325, a relative delta computation can be computed for the meaning pair consisting of the two sequentially ordered meanings. In step 330, a mumble threshold, an ambiguity threshold, and/or a compound threshold can be determined.

In step 335, the respective thresholds can be compared with the relative delta computation. In step 340, based on the comparisons, a determination can be made as to whether any irregularities exist within the input, such as include mumble, ambiguous input, and/or compound input. In step 345, any detected irregularities can be reported and appropriate programmatic actions can be taken. In step 350, a check for unprocessed meanings can be performed. If either no unprocessed meanings exist, or if the irregularities of method 300 are determined solely based upon the two possible meanings having the highest confidence values, the method can finish. However, if more meanings are to be processed, the method can proceed to step 355 where the next unprocessed meaning pair can be selected. Once the meaning pair has been selected, the method can loop back to step 325 and compute a relative delta computation for the new meaning pair. The method can repeat until all possible meaning pairs have been analyzed or until an exit condition is otherwise reached.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer implemented method for processing language input comprising the steps of:
   using at least one processor to perform:
      determining at least two possible meanings for a language input;
      determining a first probability that a first possible meaning of the at least two possible meanings is a correct interpretation of said language input;
      determining a second probability that a second possible meaning of the at least two possible meanings is a correct interpretation of said language input
      computing at least one relative delta computation comprising a value derived at least in part on a difference between at least the first probability and the second probability, the difference divided by a denominator based on the first probability;
      detecting at least one irregularity within said language input based upon said relative delta computation; and
      performing at least one programmatic action responsive to detecting said irregularity.

2. The method of claim 1, wherein said irregularity comprises mumble.

3. The method of claim 1, wherein said irregularity comprises ambiguous input.

4. The method of claim 1, wherein said irregularity comprises compound input.

5. The method of claim 1, wherein said at least one irregularity detected by said method comprises two or more irregularities, said method further comprises the step of:
   differentiating between different ones of said irregularities such that different programmatic actions are performed responsive to detecting different irregularities.

6. The method of claim 1, wherein said programmatic action comprises the step of prompting a user for further input to resolve said irregularity.

7. The method of claim 1, wherein, in computing said at least one relative delta computation;
   said difference is between the first probability and the second probability; and
   the denominator is equal to the first probability.

8. The method of claim 1, further comprising the step of receiving a top-n list of possible meanings for said language input, wherein said determining of possible meanings further comprises selecting at least two possible meanings contained within said top-n list.

9. The method of claim 8, wherein said possible meanings of said top-n list are each associated with a probability that said possible meaning is a correct interpretation of said language input, said selecting step further comprises the step of selecting said two possible meanings having the highest probabilities.

10. The method of claim 1, wherein said at least two possible meanings comprise at least three possible meanings, said method further comprises ordering said possible meanings according to the first and second probabilities and a third probability that a third possible meaning of the at least three possible meanings is a correct interpretation of said language input, wherein said computing step further comprises the steps of:
   computing a first relative delta computation based upon two sequentially ordered ones of said possible meanings; and
   computing a second relative delta computation based upon two different sequentially ordered ones of said ordered meanings, wherein said detecting of said irregularity is based upon said first relative delta computation and said second relative delta computation.

11. The method of claim 1, wherein said first and second probabilities are confidence values, said method further comprising the steps of:
receiving a plurality of language inputs;
for each language input, determining at least two possible meanings and associated confidence values;
plotting at least a portion of said confidence values on a graph; and
determining at least one threshold from said graph, wherein said relative delta computation is compared against said threshold when detecting said irregularity.

12. The method of claim 11, further comprising the step of:
presenting said graph within a graphical user interface; and
automatically adjusting said threshold using controls of said graphical user interface.

13. A system for processing language input comprising:
a computer processor configured to convert a language input into a plurality of possible meanings and to assign a confidence value to each of the plurality of possible meanings to obtain a plurality of confidence values; and
an anomaly detector configured to detect the occurrence of at least one irregularity within said language input using at least one relative delta computation, wherein said relative delta computation comprises a value derived at least in part on a difference between a first confidence value and a second confidence value from the plurality of confidence values, the difference divided by a denominator based on the first confidence value.

14. The system of claim 13, further comprising:
a training engine configured to generate thresholds used by said anomaly detector to detect said irregularities.

15. The system of claim 13, wherein said anomaly detector further comprises a relative delta score calculator configured to calculate relative delta computations.

16. The system of claim 13, wherein said anomaly detector further comprises a relative delta score interpreter configured to compare relative delta computations to threshold values to detect said irregularities.

17. The system of claim 13, wherein said anomaly detector further comprises a learning module configured to adjust threshold values base upon operational behavior.

18. Hardware having stored thereon, a computer program having a plurality of code sections, said code sections executable by a machine for causing the machine to perform the steps of:
determining at least two possible meanings for a language input;
determining a first probability that a first possible meaning of the at least two possible meanings is a correct interpretation of said language input;
determining a second probability that a second possible meaning of the at least two possible meanings is a correct interpretation of said language input;
computing at least one relative delta computation comprising a value derived at least in part on a difference between at least the first probability and the second probability, the difference divided by a denominator based on the first probability;
detecting at least one irregularity within said language input based upon said relative delta computation; and
performing at least one programmatic action responsive to detecting said irregularity.

19. The hardware of claim 18, wherein said irregularity comprises mumble.

20. The hardware of claim 18, wherein said irregularity comprises ambiguous input.

21. The hardware of claim 18, wherein said irregularity comprises compound input.

22. The hardware of claim 18, wherein said at least one irregularity detected by said method comprises two or more irregularities, said method further comprises the step of:
differentiating between different ones of said irregularities such that different programmatic actions are performed responsive to detecting different irregularities.

23. The hardware of claim 18, wherein said programmatic action comprises the step of prompting a user for further input to resolve said irregularity.

24. The hardware of claim 18, wherein, in computing said at least one relative delta computation:
said difference is between the first probability and the second probability; and
the denominator is equal to the first probability.

25. The hardware of claim 18, further comprising the step of receiving a top-n list of possible meanings for said language input, wherein said determining of possible meanings further comprises selecting at least two possible meanings contained within said top-n list.

26. The hardware of claim 25, wherein said possible meanings of said top-n list are each associated with a probability that said possible meaning is a correct interpretation of said language input, said selecting step further comprises the step of selecting said two possible meanings having the highest probabilities.

27. The hardware of claim 18, wherein said at least two possible meanings comprise at least three possible meanings, said method further comprises ordering said possible meanings according to the first and second probabilities and a third probability that a third possible meaning of the at least three possible meanings is a correct interpretation of said language input, wherein said computing step further comprises the steps of:
computing a first relative delta computation based upon two sequentially ordered ones of said possible meanings; and
computing a second relative delta computation based upon two different sequentially ordered ones of said ordered meanings, wherein said detecting of said irregularity is based upon said first relative delta computation and said second relative delta computation.

28. The hardware of claim 18, wherein said first and second probabilities are confidence values, said method further comprising the steps of:
receiving a plurality of language inputs;
for each language input, determining at least two possible meanings and associated confidence values;
plotting at least a portion of said confidence values on a graph; and
determining at least one threshold from said graph, wherein said relative delta computation is compared against said threshold when detecting said irregularity.

29. The hardware of claim 28, further comprising the step of:
presenting said graph within a graphical user interface; and
automatically adjusting said threshold using controls of said graphical user interface.

30. A system for processing language input comprising:
means for determining at least two possible meanings for a language input;
means for determining a first probability, that a first possible meaning of the at least two possible meanings is a correct interpretation of said language input;

means for determining a second probability that a second possible meaning of the at least two possible meanings is a correct interpretation of said language input;

means for computing at least one relative delta computation comprising a value derived at least in part on a difference between at least the first probability and the second probability, the difference divided by a denominator based on the first probability;

means for detecting at least one irregularity within said language input based upon said relative delta computation; and means for performing at least one programmatic action responsive to detecting said irregularity.

\* \* \* \* \*